(No Model.)

E. A. JONES.
BALL BEARING FOR VEHICLE WHEELS.

No. 541,237. Patented June 18, 1895.

Witnesses:

Edward A. Jones
Inventor.

Attorneys.

UNITED STATES PATENT OFFICE.

EDWARD A. JONES, OF TONAWANDA, NEW YORK.

BALL-BEARING FOR VEHICLE-WHEELS.

SPECIFICATION forming part of Letters Patent No. 541,237, dated June 18, 1895.

Application filed May 28, 1894. Serial No. 512,627. (No model.)

*To all whom it may concern:*

Be it known that I, EDWARD A. JONES, a citizen of the United States, residing at Tonawanda, in the county of Erie and State of New York, have invented a new and useful Improvement in Ball-Bearings for Vehicle-Wheels, of which the following is a specification.

This invention relates to that class of ball bearings for vehicle wheels which permit the wheel to be removed from the axle spindle and replaced thereon without dismembering the bearing or disturbing the balls.

The object of my invention is to produce a simple ball bearing of this kind which is applicable to axle spindles and hub boxes of ordinary construction and in which the axle-nut is connected with the bearing in such a manner that it cannot become lost.

Figure 1:
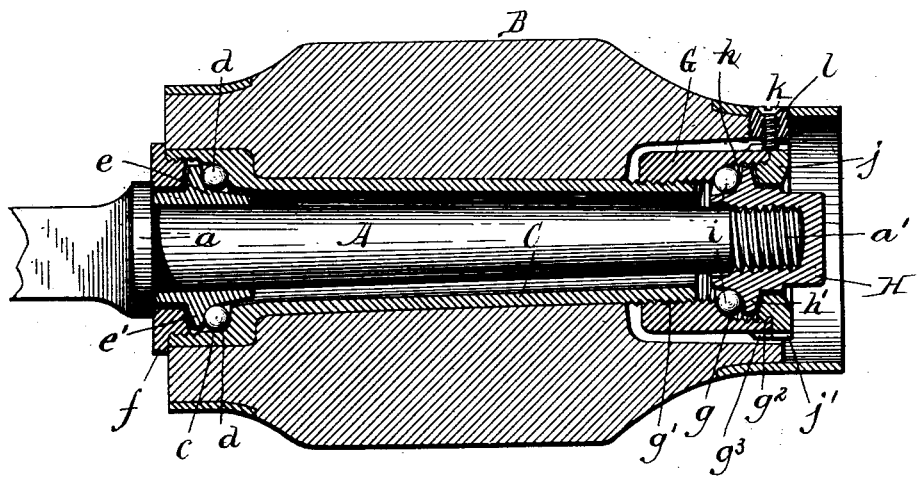
Figure 2:
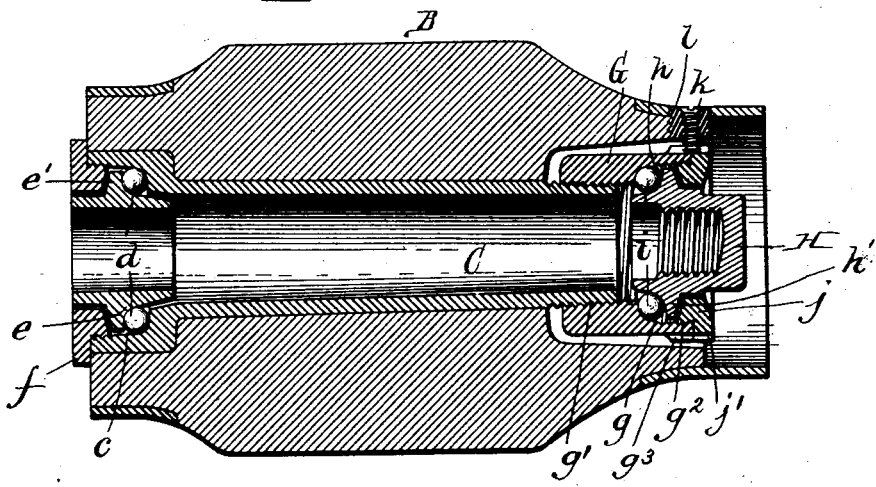
Figure 3:
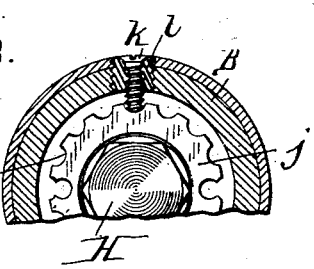

In the accompanying drawings, Figure 1 is a sectional elevation of a wheel-hub provided with my improved bearing, showing the hub applied to an ordinary axle-spindle. Fig. 2 is a similar view showing the hub removed from the axle. Fig. 3 is a fragmentary end view thereof, partly in section.

A represents the axle spindle which may be of the ordinary construction, the same having the usual collar or shoulder $a$ at its inner end and the screw thread $a'$ at its outer end.

B is the wheel hub and C the axle box or thimble secured within the bore of the hub. The axle box is provided at its inner end with an annular enlargement or chamber $c$ forming a bearing box for an inner row of balls $d$.

$e$ is an inner bearing cone surrounding the inner end of the axle spindle within the bearing box $c$ and forming the inner bearing surface of the balls $d$. This bearing cone is provided with a projecting annular flange $e'$ and is confined within the bearing box $c$ by an externally screw threaded retaining ring $f$ which is secured in the outer end of the bearing box $c$ preferably by a screw threaded connection, as shown, and which overlaps the flange of the cone.

The bearing cone $e$ is preferably made to fit the tapering spindle so snugly that it is wedged upon the spindle in applying the wheel thereto to prevent the cone from turning, but it may move longitudinally on the spindle, as hereinafter stated.

G represents an adjustable bearing sleeve applied to the outer end of the axle box and having an internal ball groove $g$. This sleeve is provided with an internal screw thread $g'$ which engages with an external thread formed on the adjacent end of the axle box.

H is an axle or lock nut applied to the external thread $a'$ of the spindle for retaining the wheel upon the same. This nut is formed with an annular bearing cone $h$ which is arranged within the outer portion of the bearing sleeve G.

$i$ represents an annular row of balls interposed between the bearing sleeve G and the cone of the axle nut.

$j$ is a retaining ring or collar surrounding the axle nut and secured in the adjacent end of the bearing sleeve, preferably by an external screw thread formed on the ring and engaging with an internal thread $g^2$ formed in the adjacent end of the bearing sleeve. The axle nut is provided with a projecting flange $h'$ bearing on the inner side of the retaining ring, and the latter overlaps said flange and connects the axle nut with the bearing sleeve, but at the same time permits the nut to turn therein for screwing the nut upon the spindle. The bearing sleeve is provided at its outer end with a notched adjusting rim $g^3$ which is adapted to receive a suitable wrench for turning the sleeve. The retaining ring is provided with a similar rim $j'$ preferably of the same diameter as that of the bearing sleeve.

$k$ is a radial locking screw connected to the hub and adapted to engage with a pair of coinciding notches of the bearing sleeve G and the retaining ring $j$ so as to prevent displacement of both of these parts. This locking screw is preferably arranged in an internally screw threaded bushing $l$ secured in the hub flange.

The outer end of the hub is recessed to permit the requisite longitudinal adjustment of the bearing sleeve upon the axle box.

Any wear of the bearing is readily taken up by loosening the locking screw $k$ and screwing the adjustable bearing sleeve G outward on the axle box, which has the effect of moving the sleeve toward the cone on the outer nut and the bearing box at the inner end of the axle box toward the adjacent inner bearing cone, thus adjusting the bearings simultaneously at both ends of the hub.

When it is desired to remove the wheel from the spindle, the axle nut is unscrewed from the end of the spindle in the ordinary manner, permitting the wheel with its ball bearing to be slipped off the spindle without disturbing any of the parts of the bearing or spilling the balls. In unscrewing the nut, its flange bears against the outer retaining ring j and draws the hub outward on the spindle, while the inner retaining ring bears against the flange of the inner cone, thereby loosening the latter and compelling it to move with the ring. By this construction, the axle nut though free to turn, like an ordinary axle nut, is permanently connected with the adjustable bearing sleeve and it cannot, therefore, become lost. By utilizing the axle nut as a part of the bearing, the number of parts is reduced and the cost of the bearing is materially diminished.

I claim as my invention—

The combination with the wheel hub having an axle box or thimble provided with an external screw thread, a bearing sleeve having an internal screw thread engaging with the thread of the axle box and a notched adjusting rim, an axle nut having a bearing cone, a retaining ring for said nut having an external screw thread engaging with an internal thread of said bearing sleeve and provided with a notched rim arranged adjacent to the notched rim of said sleeve, and a locking screw arranged in the hub and engaging with a pair of coinciding notches of the bearing sleeve and axle nut, substantially as set forth.

Witness my hand this 22d day of May, 1894.

EDWARD A. JONES.

Witnesses:
JNO. J. BONNER,
ELLA R. DEAN.